(12) United States Patent
Adamo et al.

(10) Patent No.: US 7,617,407 B2
(45) Date of Patent: Nov. 10, 2009

(54) METHOD AND SYSTEM FOR POWER CONSUMPTION MANAGEMENT, AND CORRESPONDING COMPUTER PROGRAM PRODUCT

(75) Inventors: Santi Carlo Adamo, Gravina di Catania (IT); Rosalino Critelli, Misterbianco (IT); Santi Nunzio Antonino Pagano, Catania (IT); Martino Quattrocchi, Acireale (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 494 days.

(21) Appl. No.: 11/482,517

(22) Filed: Jul. 6, 2006

(65) Prior Publication Data

US 2007/0022309 A1    Jan. 25, 2007

(30) Foreign Application Priority Data

Jul. 6, 2005    (EP) .................................. 05014614

(51) Int. Cl.
*G06F 1/32*    (2006.01)
(52) U.S. Cl. ........................ 713/320; 713/300; 713/322; 713/323
(58) Field of Classification Search .................. 713/320
See application file for complete search history.

(56) References Cited

U.S. PATENT DOCUMENTS

| | | | |
|---|---|---|---|
| 5,276,889 A | | 1/1994 | Shiraishi et al. |
| 5,481,690 A | | 1/1996 | Grumlose et al. |
| 5,655,127 A | * | 8/1997 | Rabe et al. ................... 713/322 |
| 5,802,555 A | * | 9/1998 | Shigeeda ..................... 711/106 |
| 5,815,043 A | * | 9/1998 | Chow et al. .................... 331/57 |
| 5,909,585 A | * | 6/1999 | Shinmiya ..................... 713/322 |
| 6,151,262 A | * | 11/2000 | Haroun et al. ............... 365/227 |
| 7,395,398 B2 | * | 7/2008 | Kim ............................ 711/167 |
| 2002/0026601 A1 | * | 2/2002 | Shiraga et al. ................. 714/1 |
| 2004/0141404 A1 | | 7/2004 | Tsern et al. |
| 2005/0015553 A1 | | 1/2005 | Park |
| 2007/0263471 A1 | * | 11/2007 | Schoenfeld ................. 365/227 |

OTHER PUBLICATIONS

European Search Report for EP 05 01 4614 dated Jan. 25, 2006.

* cited by examiner

*Primary Examiner*—Nitin C Patel
(74) *Attorney, Agent, or Firm*—Kevin Jablonski; Graybeal Jackson LLP

(57) ABSTRACT

A system for reducing power consumption in processing apparatus including a memory comprises a clock controller for controlling the clock period of the processing apparatus to switch the processing apparatus to a slow operating mode wherein the clock period is longer then the time required to recover from memory standby mode plus the time to execute a read command in the memory. A memory management module is provided configured for controlling the status of the memory during the slow operating mode by:
  maintaining the in a stand-by mode when no memory read/write commands are to be executed, and
  if any said read/write commands are required to be executed, switching said memory on only for the time required to perform the memory read/write commands.

28 Claims, 4 Drawing Sheets

METHOD AND SYSTEM FOR POWER CONSUMPTION MANAGEMENT, AND CORRESPONDING COMPUTER PROGRAM PRODUCT

PRIORITY CLAIM

This application claims priority from European patent application No. 05014614.1, filed Jul. 6, 2005, which is incorporated herein by reference.

TECHNICAL FIELD

An embodiment of the present invention relates to power consumption management techniques. The embodiment was developed by paying specific attention to the possible application in the field of processing devices such as e.g. micro-controllers.

BACKGROUND

Reducing the overall power consumption is a key factor in ensuring proper operation of a wide gamut of electronic components and devices.

For instance, a micro-controller can save power while it is not operating, by staying in one of its low power modes (WAIT, HALT, ACTIVE HALT). In the low power modes, the micro-controller switches off the core, the embedded oscillators, the memories, the analog macro cells and/or the gating clock to the peripherals. When a routine is to be executed, the micro-controller can be "awoken" from an external/internal interrupt. After executing the routine, the micro-controller can return to one of its low power modes until a new request arrives.

Typically, the higher is the power consumption reduction in the selected state, the longer is the time required to wake up the micro-controller from the low-power mode. To reduce the micro-controller power consumption, it is also useful to switch the internal clock controller to a low-power/low-frequency oscillator. When the micro-controller is fed with this low frequency oscillator source, the system is working in a SLOW mode. In this SLOW mode the micro-controller is still operating: the core and the other parts of the micro-controller are active but fed with a low-frequency clock thus reducing power consumption.

While operating, a micro-controller is able to access the embedded non-volatile memory in order to fetch, decode, and execute the instructions of a program. When the micro-controller is fed with a low-power/low-frequency oscillator and is working in the SLOW mode, the memory is still consuming power because the memory is always ON. When the memory is accessed by the core, it consumes power for an entire clock cycle even it the time required to access the memory is lower.

SUMMARY

From the foregoing description of the current situation, there exists the need to define solutions capable of managing power consumption in a more satisfactory way as compared to the solutions according to the known art.

An embodiment of the invention thus provides a fully satisfactory response to those needs.

An embodiment of the present invention is a method. An embodiment of the invention also relates to a corresponding system as well as to a related computer program product, loadable in the memory of at least one computer and including software code portions for performing the steps of the method of an embodiment of the invention when the product is run on a computer. As used herein, reference to such a computer program product is intended to be equivalent to reference to a computer-readable medium containing instructions for controlling a computer system to coordinate the performance of the method of an embodiment of the invention. Reference to "at least one computer" is intended to highlight the possibility for an embodiment of the present invention to be implemented in a distributed/modular fashion.

An embodiment described herein is based on the recognition of the fact that, if the micro-controller is working in the SLOW mode, the clock period is longer than the time required to execute a read memory command. In order to reduce the overall power consumption, the embodiment described herein provides a memory interface able to manage a STAND-BY low-power memory mode. When the micro-controller is working in the SLOW mode, a clock controller asserts a SLOW mode signal recognizing that the system clock period is greater than the standby memory recovery time plus the memory access time. The memory interface controls the memory status in order to maintain the memory in the STAND-BY mode when no memory read/write commands are required. The interface controls the memory entry/recover operations, using an asynchronous read access protocol. A dedicated analog circuit, able to provide a "Ready" signal, monitors the STAND-BY condition. The memory interface switches the memory ON only for the time requested to perform a memory read/write command. After the end of the memory read/write operation, the memory interface puts again the memory in the STAND-BY mode.

In this way, when the micro-controller is working in the SLOW mode, there is a significant memory-power consumption reduction. As a result, the entire micro-controller power consumption is reduced: in fact, the power-consumption contribution of the memory is often huge if compared to the other components embedded in a micro-controller.

BRIEF DESCRIPTION OF THE DRAWINGS

One embodiment of the invention will now be described, by way of example only, with reference to the enclosed figures of drawing, wherein.

DETAILED DESCRIPTION

Figure 1:
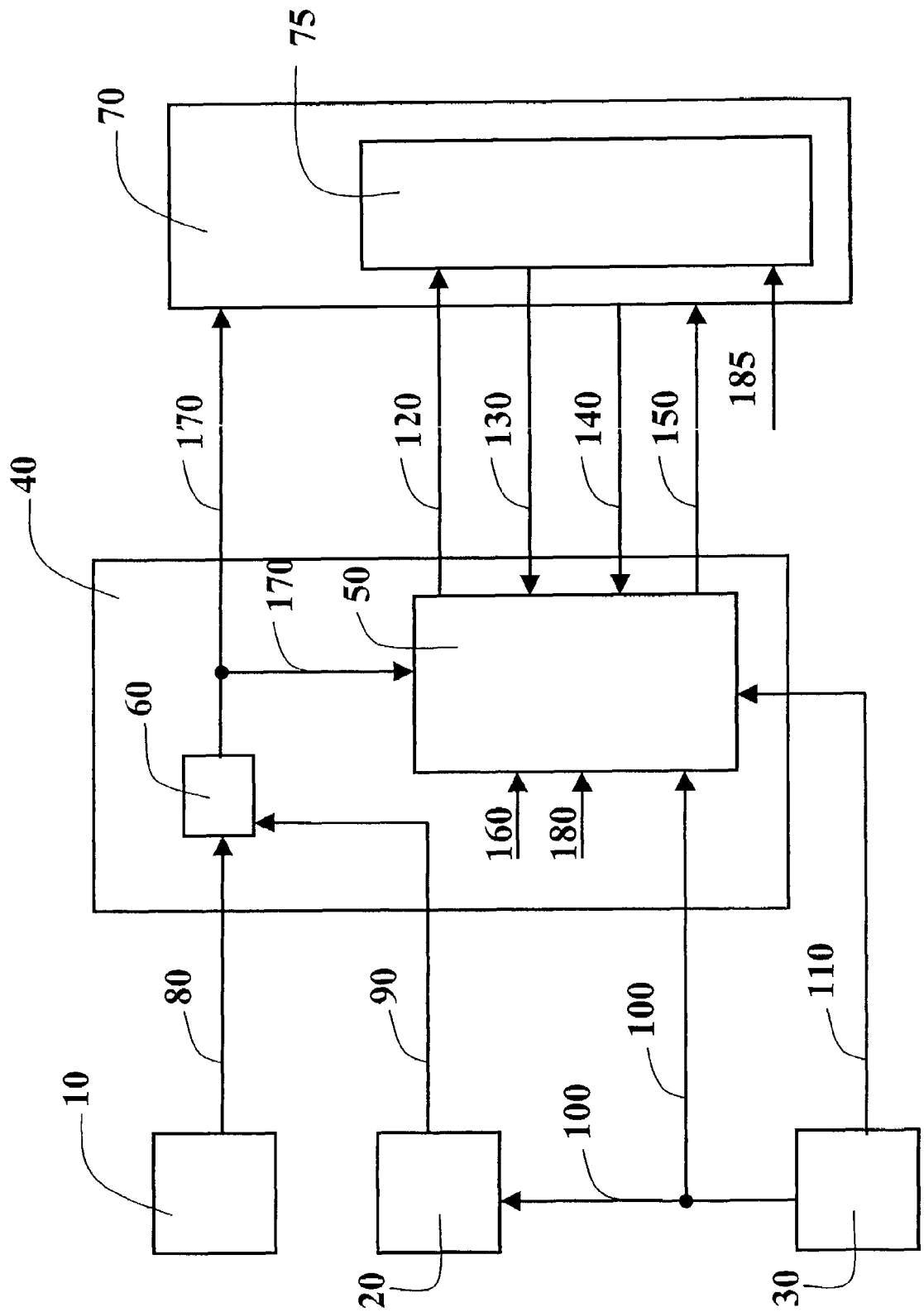
FIG. 1 shows an exemplary architecture of a micro-controller according to an embodiment of the invention.

FIG. 1 shows an example of micro-controller architecture including, according to an arrangement known per se, an address decoder 10, a "core" block 20, a clock controller 30, and a memory interface block 40 according to an embodiment of the invention. The memory-interface block 40 controls the memory access to a non-volatile memory block 70. The memory block 70 comprises a STAND-BY monitor block 75 able to generate a Ready signal on a line 130.

When the core block 20 receives a memory access command (read/write) or the micro-controller is put in a low-power mode, the memory-interface block 40 implements a protocol in order to manage the read/write access to the non-volatile memory block 70. The memory-interface block 40 also manages the entry/recover operation of the non-volatile memory block 70 in one of its low power modes (STAND-BY, POWER DOWN).

A STAND-BY management block 50 included in the memory-interface block 40 manages the entry/recover operation of the non-volatile memory block 70 from its low-power STAND-BY mode. The STAND-BY management block 50 controls the non-volatile memory block 70 by means of a "standby" signal fed on a line 120. This signal is an input for the STAND-BY monitor block 75, shown in FIG. 4, and is used to generate the output signal of the memory block 70.

When the micro-controller is in the SLOW mode, i.e. a "slowmode" signal fed on a line 110 is high, the STAND-BY management block 50 puts the memory cells of the non-volatile memory block 70 in a STAND-BY mode. When the core block 20 requires a read/write memory access, i.e. a "nselmem" signal on a line 80 is set low and a "rw" signal on a line 90 is high, a "OKSelMem" signal on a line 170 is set low and fed to the STAND-BY management block 50 and to the non volatile memory block 70. When the "OKSelMem" signal on the line 170 is low, the STAND-BY management block 50 automatically switches the memory 70 from the STAND-BY mode to an OPERATING mode.

The STAND-BY management block 50 masks the memory clock, provided by the clock controller 30 on a line 100, by means of a Ø1 line 150, until the memory has completely recovered from the STAND-BY mode.

When the memory block 70 is operative, a "ready" signal on a line 130 is fed to the STAND-BY management block 50. The STAND-BY management block 50 performs the read/write access to the memory block 70 and then puts again the memory block 70 in the STAND-BY mode setting high the standby signal on the line 120.

During a reading operation, the memory block 70 sets high a readbusy signal on line 140.

A busy signal on line 160 is set high to indicate that the memory block 70 is executing a write memory operation.

The microcontroller can be initialized by a reset signal on a line 180.

Figure 3:
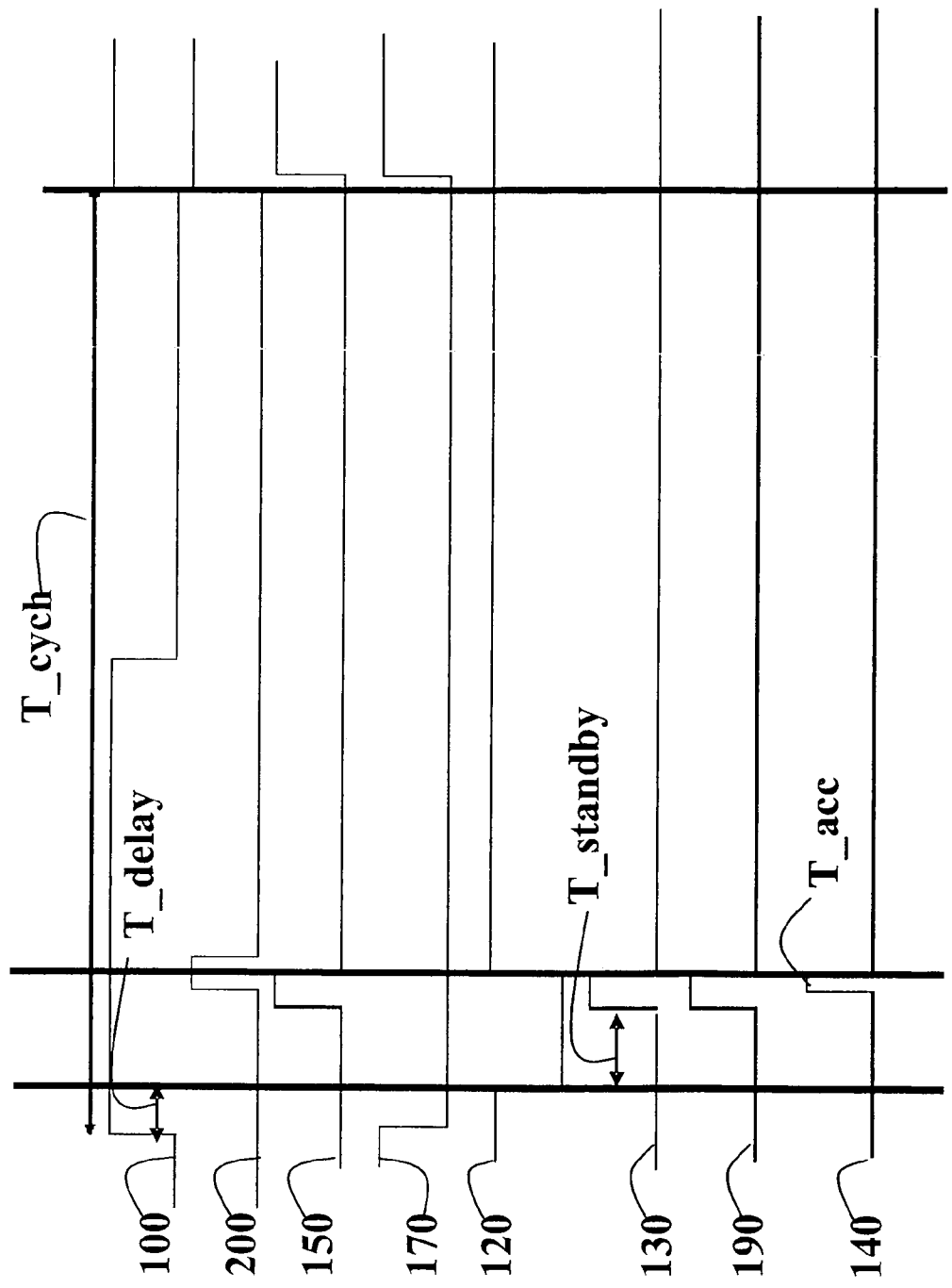
FIG. 3 shows an exemplary time-diagram of a read-memory-access operation according to an embodiment of the invention.

FIG. 3 shows a time-diagram of a read memory access operation, where the signals of FIG. 1 are shown.

The time period T_standby required for the memory to recover from the STAND-BY mode plus the access time T_acc spent to perform a read access is lower than the T_cych clock period in which the read access is executed.

In this way, when the micro-controller is in the SLOW mode, the following advantages are achieved in terms of memory power consumption:

the memory is always in the STAND-BY mode until the core requires a memory access, and the memory is accessed, for a read command, for a very short time (T_standby+T_acc) if compared to clock period (T_cych), and then the memory is put again in the STAND-BY mode.

In an embodiment, the micro-controller works in SLOW mode (and the "slowmode" signal 110 is high) with a clock source of 32 KHz (T_cych=31.25 μs), and a memory with a T_standby equal to 700 ns and a T_acc equal to 80 ns.

Figure 2:
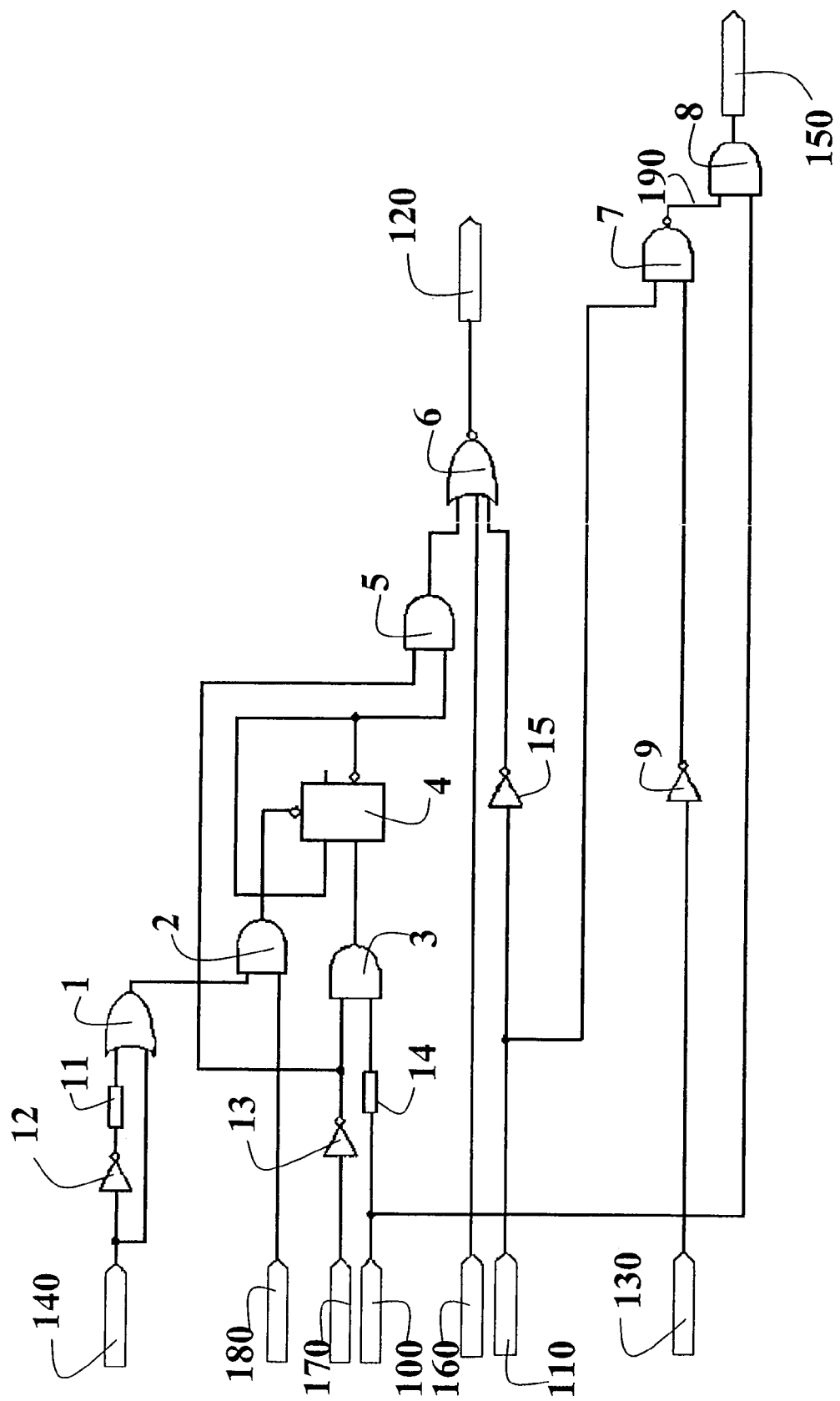
FIG. 2 shows an exemplary circuit embodiment.

FIG. 2 shows an exemplary arrangement of the STAND-BY management block 50.

The output signal of a NOR port 6 corresponds to the standby signal fed on line 120 of FIG. 1. This signal is normally high while the micro-controller is working in the SLOW mode (slowmode signal 110 high). When the core block 20 requires a memory read access in SLOW mode (slowmode signal 110 high) the CORE block 20 puts low the nselmem signal on line 80 and high the rw signal on line 90 for a clock cycle. As a consequence, the memory interface block 40 puts low the memory read enable OkSelMem signal on line 170 which is the input of an inverter port 13. The output of the inverter 13 and the output of a delay cell 14 are fed to an AND port 3 which is the clock for a Flip-Flop block 4.

When there is a read access attempt by the core block 20, the output of the Flip-Flop 4 is switched from logic value zero to logic value one, and as a consequence the output of an AND port 5 goes high.

The consequence of a reading access is that the standby signal 120, output of a NOR port 6, goes low, indicating that memory is to be awakened from the STAND-BY mode to perform a read access command.

After a T_stop period of 700 ns the memory is ready, so the ready signal on line 130 goes high. During the T_stop period, when the ready signal on line 130 is low, the output of an INVERTER 9 is high, so a mask signal, output of a NAND port 7, is low. A mask signal on line 190 (see FIG. 2 and FIG. 3) coming from NAND port 7 masks the memory Ø1 clock signal on line 150, which is the output signal of an AND port 8, in order to prevent the core block 20 from starting a read access while the memory block 70 is not ready. After the T_stop period, the ready signal on fine 130 is set high by the memory, indicating that the memory block 70 is ready to be accessed.

At this moment, the Ø1 signal on line 150, is unmasked and the readbusy signal on line 140 is set high for a T_acc period, when line 200, that is the Ø1 signal shifted clock generated inside the memory, is high (see FIG. 2), indicating that a reading operation is in course.

After the T_acc period the read data is available, and the memory block 70 sets low the readbusy signal on line 140. An impulse imp_rb is generated at the output of an OR port 1 (which has as inputs the readbusy signal and the output of the delay cell 11). In this way, after the conclusion of the read access, the output of the Flip-Flop 4 goes low and the standby signal on line 120 goes high again in order to specify that the memory is again in the STAND-BY mode.

On the other hand, if the core block 20 requires a write access, the memory interface sets high the busy signal on line 160 for the memory-write access time so the output standby signal of the NOR port 6 goes low in order to allow the write operation in the memory block 70.

Figure 4:
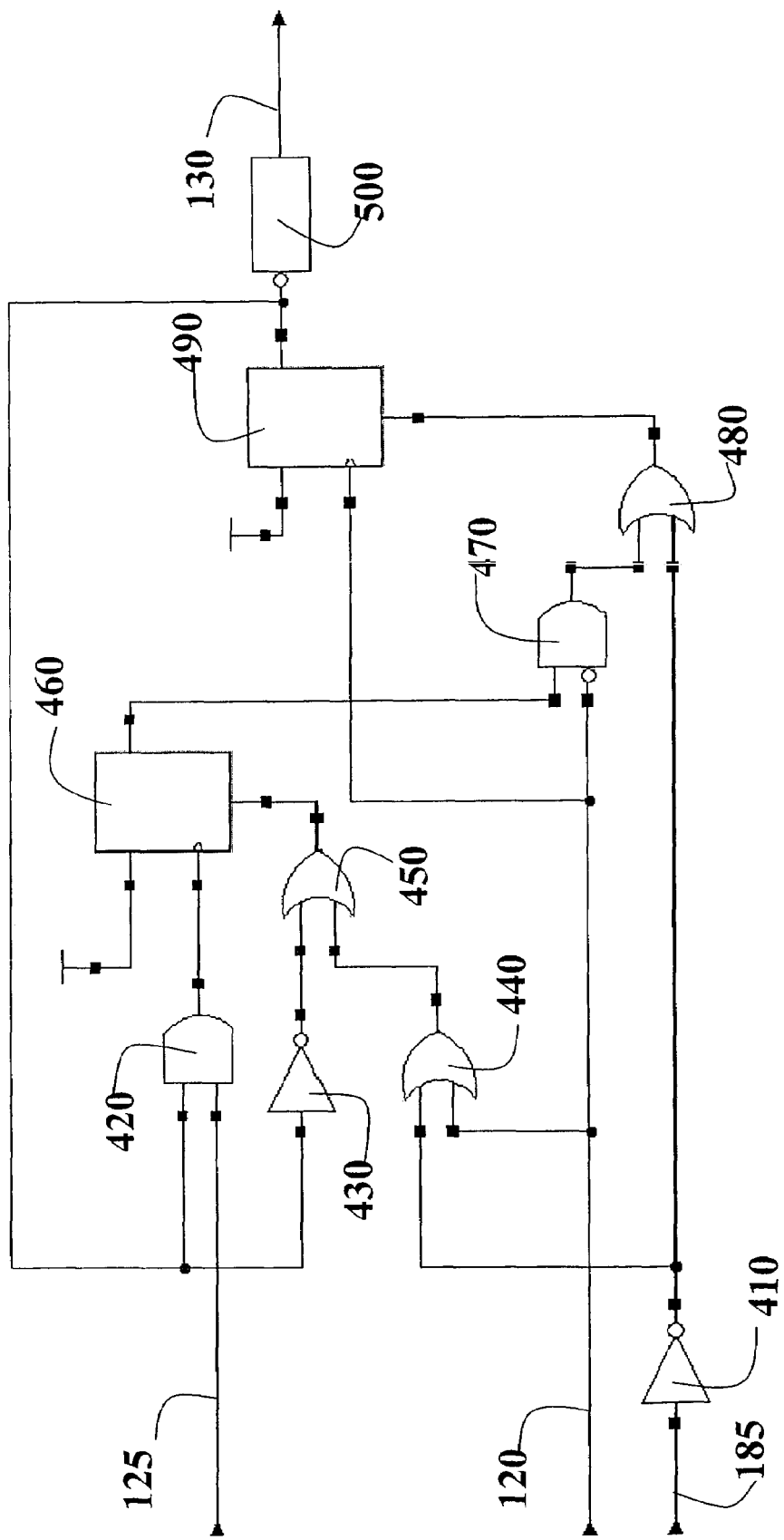
FIG. 4 shows a portion of the memory block of FIG. 1 according to an embodiment of the invention.

FIG. 4 shows an example of an embodiment of the STAND-BY monitor block 75. This arrangement is used to generate the "Ready" signal on line 130 able to monitor the STAND-BY mode.

In the reset state, i.e. when the signal on line 185 is low, a Flip-Flop block 490 is reset by the output of an OR port 480 driven by an INVERTER port 410 and an AND port 470, the Ready signal on line 130 is high and the memory block 70 is not in STAND BY mode.

In the OPERATING mode, the Standby signal on line 120 is low, the Reset signal on line 185 is high, and the Ready signal on line 130 is still high.

When the Standby signal on line 120 goes high, the memory block 70 enters the STAND-BY mode, the Flip-Flop 490 switches and the Ready signal on line 130 goes to the low level without any delay. In this mode the memory block 70 is in a low-consumption state and cannot be accessed for a reading or erasing/writing operation.

An out_reg_boost signal on line 125 is the output of a BOOST regulator and gives the information that the HV voltage (VBOOST), to perform the reading operation, has overcome a specific threshold. In the STAND BY mode the BOOST circuit is on, working with a specific regulation (STAND-BY regulation). This is a soft, less accurate regulation that ensures a voltage VBOOST quite stable around its final value.

The out_reg_boost signal on line 125 is fed to an AND port 420 which receives as input the output signal from the Flip-Flop block 490. The output signal of the AND port 420 is fed to the CLOCK input of a Flip-Flop block 460.

In order to recover the memory block 70 from the STAND-BY mode, the Standby signal on line 120 go low; in this way the reset of the Flip-Flop block 460 is released and on the first rising edge of the out_reg_boost signal on line 125 the output of the Flip-Flop block 460 goes high forcing to the logic value "one" the output of the Flip-Flop block 490.

An OR port 440 receives as input the Standby signal on line 120 and the output signal of the INVERTER port 410.

The output of the Flip-Flop block 490, is fed to an INVERTER port 430. The output signal of port 430 is fed to an OR port 450, that receives also the output signal from the OR port 440. The output signal of the OR port 450 is fed to the RESET input of the Flip-Flop block 460.

The output of the Flip-Flop block 460 is fed to the AND port 470 that receives also as input the inverted Standby signal.

The output of the Flip-Flop block 490, after a delay introduced by an analog delay block 500, is transferred on the Ready signal on line 130.

The analog delay 500 used in this embodiment is able to delay a signal only when there is a transition from the low level to the high level.

In conclusion, the Ready signal on line 130 is low when the Standby signal on line 120 is high (memory in STAND-BY mode) and also when the Standby goes low and the memory has not yet completed the recovery from the STAND-BY mode.

The circuitry described above may be disposed in an Integrated Circuit (IC), such as a system on a chip, and this IC may be incorporated into a system.

Without prejudice to the underlying principles of the invention, the details and the embodiments may vary, also appreciably, with reference to what has been described by way of example only, without departing from the spirit and scope of the invention.

What is claimed is:

1. A method of reducing power consumption in a processing apparatus including a memory, the method including the steps of:
   controlling a clock period of the processing apparatus to switch said processing apparatus to a SLOW OPERATING mode, the clock period being longer than a time required to recover from memory STAND-BY mode plus a time to execute a read command in said memory,
   controlling said memory during said SLOW OPERATING mode by:
   maintaining said memory in a STAND-BY mode when no memory commands are to be executed, and
   if any said memory commands are required to be executed, switching said memory ON for a time required to perform said memory commands.

2. The method of claim 1, further including the steps of returning said memory to said STAND-BY mode after said memory commands have been performed.

3. The method of claim 2, further including the step of switching said memory on only for the time requested to perform said memory commands.

4. The method of claim 1, further including the step of masking the clock signal to said memory until said memory has recovered from said STAND-BY mode.

5. The method of claim 1, further including the step of generating a signal able to monitor said STAND-BY mode.

6. A tangible computer-readable medium having computer-executable instructions, loadable in the memory of at least one computer and including software code portions for performing the steps of the method of claim 1.

7. A system for reducing power consumption in a processing apparatus including a memory, the system including:
   a clock controller for controlling a clock period of the processing apparatus to switch said processing apparatus to a SLOW operating mode, the clock period being longer then a time required to recover from memory STAND-BY mode plus a time to execute a read command in said memory, and
   a memory management module configured for controlling said memory during said SLOW operating mode by:
   maintaining said memory in a STAND-BY mode when no memory commands are to be executed, and
   if any said memory commands are required to be executed, switching said memory ON for a time required to perform said memory commands.

8. The system of claim 7, wherein said memory management module is configured for returning said memory to said STAND-BY mode after said memory commands have been performed.

9. The system of claim 7, wherein said memory management module is configured for switching said memory ON only for the time requested to perform said memory commands.

10. The system of claim 7, wherein said memory management module is configured for masking the clock signal to said memory until said memory has recovered from said STAND-BY mode.

11. The system of claim 7, further includes a monitor block configured for generating a signal able to monitor said STAND-BY mode.

12. The system of claim 7, wherein said processing apparatus is a micro-controller.

13. An integrated circuit, comprising:
   a memory having an access time and a time for transitioning between a low-power state and an operating state;
   a processing unit operable to access the memory during a low-power mode;
   a clock generator operable to generate a clock signal having a first period during an operating mode and having a second, longer period during the low-power mode, the second period being longer than a sum of the access and transition times; and
   a controller coupled to the memory, the processing unit, and the clock generator and operable to cause the memory to
   enter the low-power state,
   transition from the low-power state to the operating state in response to an access request from the processing unit during the low-power mode, and
   execute the requested access in response to the clock signal while in the operating state during the low-power mode.

14. The integrated circuit of claim 13 wherein the controller is further operable to cause the memory to transition back to the low-power state from the operating state after executing the requested access.

15. The integrated circuit of claim 13 wherein the memory is operable to store program instructions for execution by the processing unit.

16. The integrated circuit of claim 13 wherein the controller comprises:
- a first section operable to
  - generate a mode signal having a first level corresponding to the operating state and having a second level corresponding to the low-power state,
  - isolate the memory from the clock signal while the memory is in the low-power state, and
  - couple the clock signal to the memory while the memory is in the operating state; and
- a second section operable to
  - cause the memory to transition from the operating state to the low-power state in response to the mode signal transitioning from the first level to the second level,
  - causing the memory to transition form the low-power state to the operating state in response to the mode signal transitioning from the second level to the first level,
  - generate a state signal having a first level that indicates that the memory is in the operating state and having a second level that indicates that the memory is in the low-power state, and
  - generate an access signal having a first level that indicates that the memory is executing the requested access and having a second level that indicates that the memory has finished executing the requested access.

17. An electronic system, comprising:
an integrated circuit, comprising
- a memory having an access time and a time for transitioning between a low-power state and an operating state,
- a processing unit operable to access the memory during a low-power mode,
- a clock generator operable to generate a clock signal having a first period during an operating mode and having a second, longer period during the low-power mode, the second period being longer than a sum of the access and transition times, and
- a controller coupled to the memory, the processing unit, and the clock generator and operable to cause the memory to
  - enter the low-power state,
  - transition from the low-power state to the operating state in response to an access request from the processing unit during the low-power mode, and
  - execute the requested access in response to the clock signal while in the operating state during the low-power mode.

18. A method, comprising:
- increasing a period of a clock during a low-power mode, the increased period being longer than a sum of an access time of a memory and a time for transitioning the memory from a low-power state to an operating state;
- transitioning the memory to the low-power state;
- transitioning the memory from the low-power state to the operating state in response to a request to access the memory during the low-power mode; and
- servicing the request with the memory in response to a clock signal during the low-power mode and while the memory is in the operating state.

19. The method of claim 18 wherein:
- transitioning the memory to the low-power state comprises transitioning the memory to the low-power state in response to a state signal transitioning from a first level to a second level; and
- transitioning the memory from the low-power state to the operating state comprises transitioning the memory from the low-power state to the operating state in response to the state signal transitioning from the second level to the first level.

20. The method of claim 18 wherein servicing the request comprises:
- generating a ready signal with the memory in response to the memory completing the transition from the low-power state to the operating state; and
- coupling the clock to the memory in response to the ready signal.

21. The method of claim 18 wherein servicing the request comprises:
- generating a ready signal with the memory in response to the memory completing the transition from the low-power state to the operating state; and
- providing to the memory in response to the ready signal an address of a memory cell to be accessed.

22. The method of claim 18 wherein servicing the request comprises generating a busy signal with the memory while the memory is servicing the request.

23. The method of claim 18, further comprising isolating the memory from the clock while the memory is in the low-power state.

24. The method of claim 18, further comprising transitioning the memory from the operating state back to the low-power state after servicing the request.

25. The method of claim 18, further comprising:
- wherein servicing the request comprises servicing the request during a first cycle of the clock; and
- transitioning the memory from the operating state back to the low-power state after servicing the request and before a second cycle of the clock.

26. A method, comprising:
- transitioning a circuit to a low-power state;
- transitioning the circuit from the low-power state to an operating state during a first period of a clock in response to a first request to access the circuit, the first period of the clock being longer than a sum of an access time of the circuit and a time for transitioning the circuit from the low-power state to the operating state;
- accessing the circuit in response to the request during the first period of the clock and while the circuit is in the operating state; and
- transitioning the circuit from the operating state back to the low-power state after servicing the request and during the first period of the clock.

27. The method of claim 26, further comprising:
- transitioning the circuit from the low-power state to the operating state during a second period of the clock in response to a second request to access the circuit, the second period following and being substantially the same length as the first period of the clock;
- accessing the circuit in response to the second request during the second period of the clock and while the circuit is in the operating state; and
- transitioning the circuit from the operating state back to the low-power state after servicing the request and during the second period of the clock.

28. The method of claim 26 wherein the circuit comprises a memory.

* * * * *

UNITED STATES PATENT AND TRADEMARK OFFICE
CERTIFICATE OF CORRECTION

PATENT NO.      : 7,617,407 B2  
APPLICATION NO. : 11/482517  
DATED           : November 10, 2009  
INVENTOR(S)     : Adamo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 621 days.

Signed and Sealed this

Nineteenth Day of October, 2010

David J. Kappos  
*Director of the United States Patent and Trademark Office*